US007769627B2

(12) United States Patent
Sabharwal et al.

(10) Patent No.: US 7,769,627 B2
(45) Date of Patent: Aug. 3, 2010

(54) ASSESSING SURVEY PRESENTATIONS

(75) Inventors: Yogish Sabharwal, New Delhi (IN); Raghavendra Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1629 days.

(21) Appl. No.: 11/013,484

(22) Filed: Dec. 16, 2004

(65) Prior Publication Data

US 2006/0136283 A1 Jun. 22, 2006

(51) Int. Cl.
G06Q 10/00 (2006.01)
(52) U.S. Cl. ........................................................ 705/10
(58) Field of Classification Search ................... 705/10
See application file for complete search history.

(56) References Cited

U.S. PATENT DOCUMENTS

| 6,093,026 | A | * | 7/2000 | Walker et al. ................ 434/322 |
| 6,381,744 | B2 | * | 4/2002 | Nanos et al. ................... 725/24 |
| 6,385,590 | B1 | * | 5/2002 | Levine ......................... 705/10 |
| 6,865,578 | B2 | * | 3/2005 | Hays ................................ 1/1 |
| 7,398,270 | B1 | * | 7/2008 | Choi et al. ....................... 707/6 |
| 2004/0093261 | A1 | | 5/2004 | Jain et al. |
| 2006/0155513 | A1 | * | 7/2006 | Mizrahi et al. .............. 702/179 |

OTHER PUBLICATIONS

"Methods for Testing Data Quality, Scaling Assumptions, and Reliability The IQOLA Project" JE Ware, B Gandek—Journal of Clinical Epidemiology, 1998—Elsevier.*
"Do people mean what they say? Implications for subjective survey data", M Bertrand, S Mullainathan—American Economic Review, 2001—jstor.org.*
An assessment of survey research in POM: from constructs to theory MK Malhotra, V Grover—Journal of Operations Management, 1998—Elsevier.*
Survey nonresponse adjustments RJA Little—International Statistical Review, 1986—amstat.org.*
"Assessment of weighting methodology for the National Comorbidity Survey"—oxfordjournals.org, RJA Little, S Lewitzky, S Heeringa, J . . . —American journal of epidemiology, 1997—Oxford Univ Press.*
Spacing, position, and order: Interpretive heuristics for visual features of survey . . . umich.edu [PDF] R Tourangeau, MP Couper, F Conrad — Public Opinion Quarterly, 2004—AAPOR.*
"Changing the survey process" firstmonday.org [HTML] H Gunn—First Monday, 2002—firstmonday.org.*
Benchmarking by state space models J Durbin, B Quenneville—International Statistical Review/Revue . . . , 1997—jstor.org.*
Assessing Sample Bias and Establishing Standardized Procedures for Weighting . . . Isu.edu [PDF] F Nilufar—2003—etd.Isu.edu.*
Biemer, Paul; "Methodology for Optimal Dual Frame Sample Design", 1984, Census.gov report, Report No. Census/SRD/RR-84/07 pp. 1-47.*
The effect of web survey design features on user response. IS Guttek—2002—auspace.athabascau.ca.*

* cited by examiner

*Primary Examiner*—Jonathan G Sterrett
(74) *Attorney, Agent, or Firm*—Gibb I.P. Law Firm, LLC

(57) ABSTRACT

Measurement errors arising from presentation aspects of a survey are detected and can be corrected, based upon responses from a selected set of respondents to different survey presentations. The survey presentations are different not in their information content, but in their presentation, such as using a different order of questions. An alternative presentation or presentations for the survey can be derived such that the measurement error is reduced. Accordingly, an "unbiased" survey can be designed in the pre-deployment phase, or measurement errors can be detected and corrected during the deployment phase.

14 Claims, 4 Drawing Sheets

ASSESSING SURVEY PRESENTATIONS

FIELD OF THE INVENTION

The present invention relates to assessing survey presentations, such as marketing surveys and the like.

BACKGROUND

Surveys are one of the most popular methods of obtaining business intelligence. For example, customers' preferences, pain points and future intent are some of the common forms of business intelligence gathered using surveys. Gathering business intelligence using surveys typically consists of several steps, sometimes referred to as: "Goal", "Who", "What", "How" and "Analysis".

The "Goal" step defines the goals of the survey (what is to be learnt from the survey exercise), the "Who" step defines who is going to be asked to provide feedback, the "What" step involves creating a set of questions, the "How" step defines the presentation and administration of the survey. The "Analysis" step defines what would be done to the responses to obtain business intelligence.

Measurement errors in surveys are deviations of the respondents' answers from their true value on the measure. For "online" surveys, and more particularly those offered or administered via the World Wide Web, there are two main sources of measurement errors, which stem from the Web questionnaire itself.

The first source of error is the wording of the questions or the flow of the questionnaire that can both have an effect on the quality of respondents' answers. The second source of error is the questionnaire form, (that is, the visual layout of the questionnaire), which is of particular importance in self-administered surveys. These aspects have been studied in detail in the socio-psychological field, with the emphasis on developing certain guidelines or heuristics that can be used to design "better" survey presentations, that is, presentations that lead to a smaller measurement error. A need clearly exists for an improved method of assessing survey presentations.

SUMMARY

Measurement errors in surveys are deviations of the respondents' answers from their true value on the measure. Errors result, in general, from inaccurate responses that may stem from poor questionnaire design, biased question flow, and poor visual layout, amongst other factors.

The techniques described herein relate to detecting and also correcting measurement errors in a survey, based upon responses from respondents to different survey presentations. First, different surveys are presented to different respondents. The surveys are different not in their information content, but in their presentation (for example, surveys with a different order of questions). These different surveys are presented to a carefully sampled set of respondents. Second, the responses received from respondents are used to detect, estimate and correct the measurement error in the surveys.

Optionally, an alternate presentation or presentations for the survey can be generated such that the measurement error is reduced. Thus the method can be used either in the pre-deployment phase to design an "unbiased" survey, that is, a survey with minimal measurement error, or can be used in the deployment phase to detect and correct the measurement error by analyzing the responses of a given set of surveys offered in different presentations.

DETAILED DESCRIPTION

Figure 1:
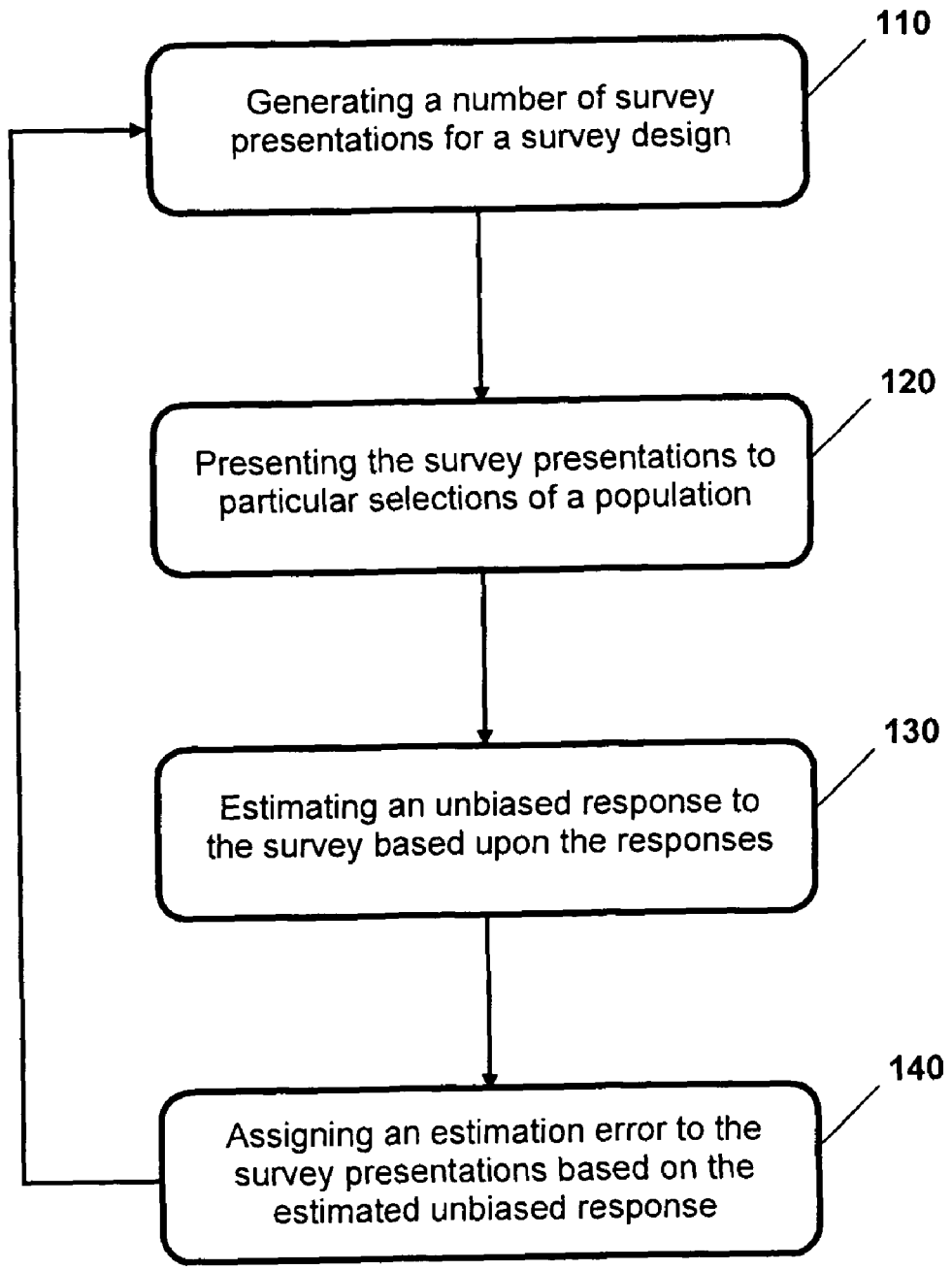
FIG. 1 is a flow chart of steps involved in the technique for refining survey presentations.

FIG. 1 flow charts, in overview, steps involved in refining survey presentation. First, a number of different survey presentations are generated for a particular survey in step 110. Then, these various survey presentations are presented to particular selections of a population in step 120. An unbiased response to the survey is estimated, based on an analysis of the survey responses, in step 130. Based upon this estimated unbiased response, estimation errors are assigned to each of the survey presentations in step 140. The estimation error can be used to compensate survey findings, and the process can be iterated to design survey presentations that have lower measurement errors.

Survey Presentation Design

The survey presentation design component designs alternative presentations of the survey. Note that it does not design the information content of a survey, a survey designer designs a survey, that is, completes the "Goal", "Who" and "What" steps of the survey. The survey presentation design component then defines "How" the survey is presented to the user.

Different features of a presentation may include the following:

1. Question Ordering: The ordering of questions has an impact on the survey responses. For example there are well known psychological heuristics that suggest that negative questions should not be asked in the beginning of a survey. Thus the questions can be ordered in different ways in different presentations of the survey.
2. Word Phrasing: A question could have a different word phrasing, each phrasing delivering the same information content but maybe with different connotations. Thus, selecting alternate phrasing for each question allows for alternate presentations.
3. Color: The background (or foreground) color could affect the survey responses, for example, use of particular colors may in some circumstances bias the response towards a corporation that uses a similar color in its branding. Thus different presentation can use different colors in presenting a question.
4. Display Type: There are different display types for the given questions constituting the survey, for example, options for a Select question can be shown in the form of radio buttons or drop-down list box, or options for a Select multiple questions can be shown as Check-boxes or 2-buckets with add/remove options. Each of these displays affect the survey response maybe because the default response option that is visible may be different. Thus different display types can be used to design different presentations.

One may perhaps anticipate, based on relevant experience or reasoning, the likely effects of some of the above presentation factors on the survey response. For example, one may expect more respondents to select the default displayed option in a drop-down list box than to select the default option in a radio button list. This is because all the options are not visible in a drop-down list box, and time and effort is required on the respondents' part to view the entire list of options.

The effect of more complex presentation designs are more difficult to anticipate, as various presentation factors may interact.

The survey designer could for each question, list the possibilities of the question's position (with respect to other questions), a list of word phrasings, a list of colors, and a list of display types. Multiple presentations of surveys are then generated using a combination of these features. As described in further detail below, these presentations are then offered to a set of respondents, and the resulting responses analyzed to detect measurement error. One can then compensate for such measurement errors.

If the goal is to find a survey presentation that has a minimum measurement error, the respondent data collected in previous iterations can be used in suggesting an alternate presentation of the survey that has less measurement error.

Each survey presentation can be mapped onto a point in the feature space defined by the various presentation features, for example, color, word phrasing, and so on. The initial set of survey presentations can be selected from the set of valid presentation designs in the feature space by taking presentations that are pair-wise distant in order to cover the feature space well.

Distances in the feature space can be defined as follows. For question ordering, the distance between the presentations can be taken as the sum of the distances between the questions, where the distance of a question in the presentations is defined as the number of positions that they are apart by. For other features like display types, colors and word-phrasings, indicator function can be taken as the distance metric, that is, different values can be taken as unit distance apart. The combined distance of multiple presentation features (question ordering, color, and so on) can be taken by adding the individual distances after appropriate scaling.

If applied iteratively, the presentations for further iterations, that is, points in the space, can be selected based on any local search heuristics techniques such as Hill Climbing, Genetic Algorithms, Simulated Annealing, Tabu search, Ant colony optimization, and so on, where the goal is to find a presentation (that is, a point in the feature space) with minimum measurement error. The measurement error is computed for each presentation, as described in further detail below.

Selection of Respondents

Respondents are desirably selected as a fair representation of the generic population. A constraint on the sampled population, however, is that the analysis method (described below) can create groups of the sampled population with similar "profiles", with each group containing sufficient number of respondents.

Some examples of attributes that could constitute profiles are age, sex, country, political affiliation, income group, and so on. If the profile information is not available beforehand, the first few questions of the survey can be used to gather the profile information. Moreover, the respondents can be matched by profile across the different survey presentations, that is, different respondents of each of the profiles are desirably offered all of the different presentations.

The reason for selecting similar respondents is that one expects respondents of similar profile to respond similarly to questions in an unbiased survey, that is, a survey with no measurement error. Moreover, if a set of surveys with different presentations is offered to similar respondents then in most of the presentations, most of the respondents are not biased in their response. That is, there may be a few presentations in which most of the respondents are biased in their response, but in most presentations few respondents are biased in their response.

Analysis of Responses

Survey responses are analyzed to detect, and in some cases correct, measurement errors. As described above, different presentations of the survey are offered to respondents, who can be grouped according to their profiles. Multiple responses are analyzed to detect and correct the measurement error and optionally generate a survey presentation design with minimum measurement error, if required.

One can determine if there is a significant bias (measurement error) in any of the survey presentations in the offered set of presentations. Detection requires an estimation of the unbiased response across the set of offered survey presentations. The measurement error is the measure of the deviation of the observed set of responses from this estimated unbiased response. If this is significant then the presence of bias in the set of survey presentations is indicated.

Given the multiple responses, any standard estimation technique (for example, Least Mean Square Estimation, Max A Priori Estimation) can be used to estimate the unbiased response f. To improve the estimate, robust estimation techniques and/or penalty regularization techniques, as described below, can be used.

As stated above, if a set of surveys with different presentations is offered to similar respondents then, in most of the presentations most of the respondents are not biased in their response. Therefore, the few outliers (that is, the survey presentations that bias a large fraction of the respondents) can be removed by using robust estimation techniques.

One example of a robust estimation technique is summarized in the pseudocode of Table 1 below.

TABLE 1

For each question
    For each profile
        To eliminate the m (some threshold) survey presentations that
        have the most deviating responses, repeat the following steps:
            Find the average of the response distributions of the
            remaining set of survey presentations.
            Mark and remove the survey presentation for which the
            response distribution deviates most from the average
            response distribution.
    End
End Additional prior information can aid the estimation. Compared to more conventional techniques, such as MAP estimation, penalty regularization provides increased flexibility in selecting the penalty: explicit knowledge of a statistical prior is not required. This is an appreciable advantage, because: (i) priors are often not available; and (ii) priors may be difficult to describe analytically. Penalty regularization is defined as in Equation [1] below.

$$\hat{f} = \underset{f}{\operatorname{argmin}}[-\ln p(y|f) + \lambda\Phi(f)] \quad [1]$$

Equation [1] above defines y as the observed variable, f as the variable to be estimated, and $\Phi(f)$ as the penalty or regularization function, which takes into account a priori knowledge about f, and $\hat{f}$ the estimate variable.

An example of a penalty regularization function for estimating unbiased survey response uses the reasonable assumption that in an unbiased survey, similar respondents answer a question in a similar way. Mathematically, this implies that the probability distribution function (pdf) of the responses (for a question) is such that its entropy is low, that is, $\Phi(f)$ measures the entropy of the pdf. The unbiased response $\hat{f}$ is then estimated as per Equation [2] below.

$$\hat{f} = \underset{f}{\operatorname{argmin}} \sum_{questions} \sum_{profiles} [-\ln p(y|f) + \lambda\Phi(f)] \quad [2]$$

A final step is to compute the degree of bias in a given survey presentation. This depends upon the deviation between observed response (y), and estimated unbiased response ($\hat{f}$). This deviation can be calculated using suitable divergence measure between probability distribution such as KL Divergence/JS Divergence. This deviation is denoted herein as E.

Figure 2:
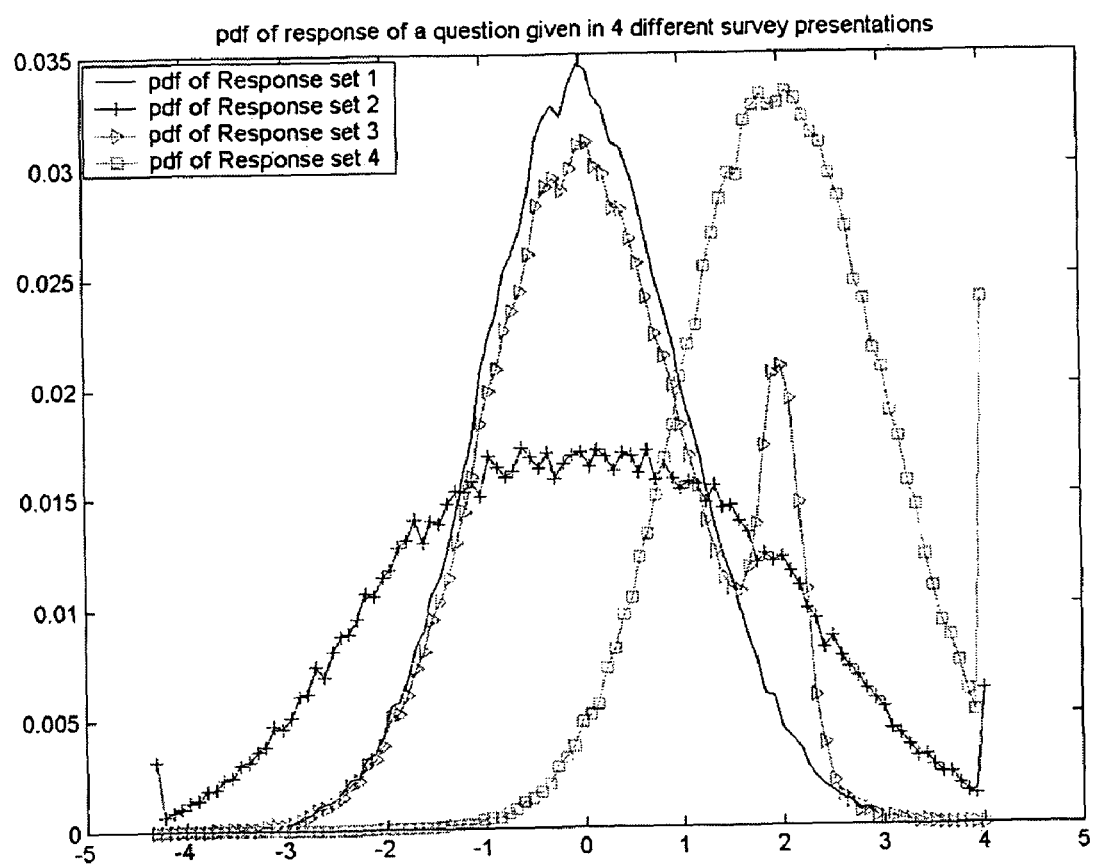
FIG. 2 is a graph of four probability distribution functions corresponding to responses to a specific question for a specific respondent profile in four different survey presentations.
Figure 3:
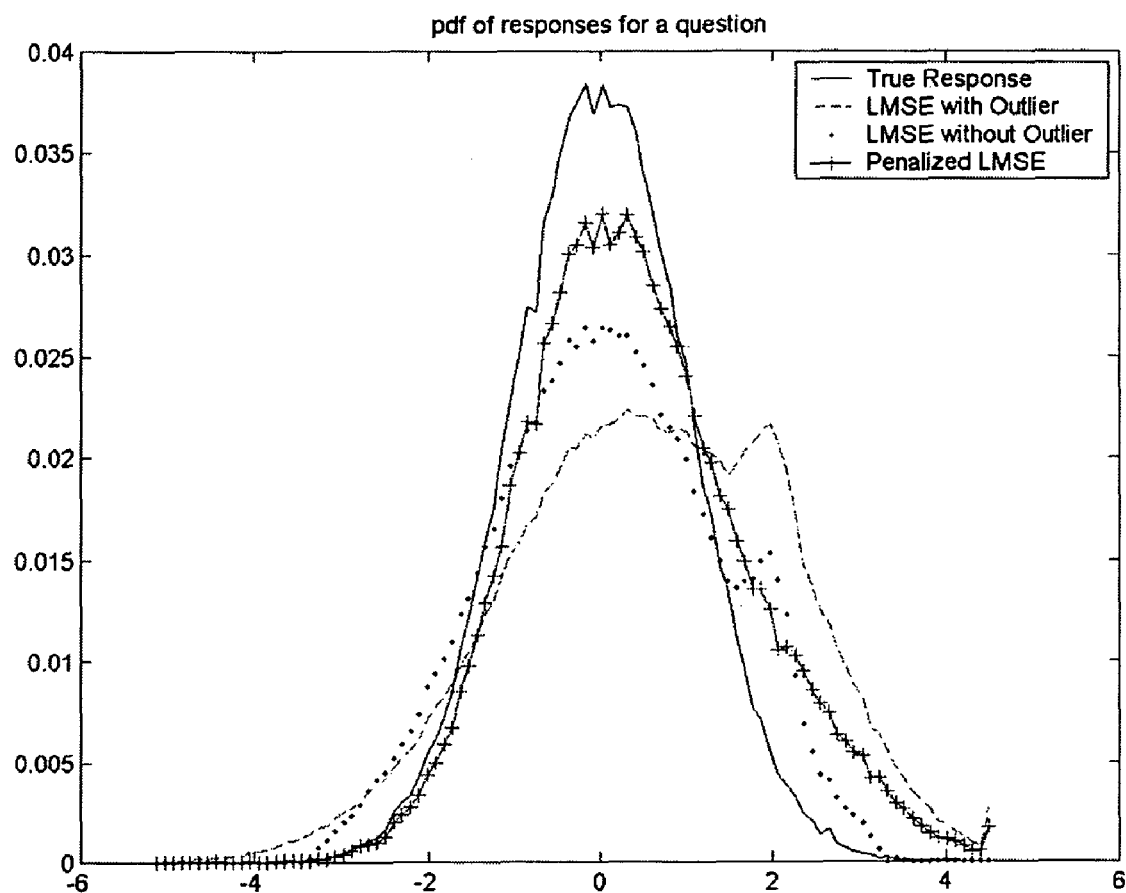
FIG. 3 is a graph of a probability distribution function corresponding to the actual true response and three different estimates of the probability distribution function corresponding to the true response obtained using the observed responses shown in FIG. 2.

FIG. 2 and FIG. 3 jointly illustrate an example of how responses can be analyzed to detect the measurement error and estimate the true response (unbiased). In this example the survey is provided in four different presentations. The responses for a particular question are collected for all four presentations. The pdf for each presentation of the responses is displayed in FIG. 2. The responses are from respondents of a similar profile.

FIG. 3 displays the pdf of the actual "true" response (for the question under consideration), and three different estimates of the pdf of the true response. The first estimate ("LMSE with Outlier") uses a least mean square estimator on all four observed response pdfs (from FIG. 2). The second estimate ("LMSE without Outlier") uses a least mean square estimator after removing the outliers of the observed responses, using a robust estimator. The third estimate ("Penalized LMSE") uses least mean square estimator after removing the outliers of the observed responses and uses entropy as the penalty function. Thus, this estimation prefers a pdf that has lower entropy.

The compensated or corrected response is the estimated unbiased response ($\hat{f}$). The corrected response can be reported for each question of the survey individually, for each profile (in the set of profiles of respondents), or for an entire survey presentation.

Optimal Survey Presentation

Alternate survey presentations can be designed to minimize measurement error, based on the analysis of responses to the offered survey presentations. This can be done by modeling the measured error as a cost function of the presentation factors, and then searching for the factors that minimize the cost function. The cost function can be formulated using standard methods such as regression analysis. Domain specific knowledge can be used to refine the cost functions. The modeled objective function can be minimized using search algorithms such as, randomized search, Genetic algorithms, Tabu search or other machine learning algorithms.

As an example, let $q_1, q_2, \ldots, q_n$ be a list of n questions. In a given survey presentation design, the presentation factors that affect the measurement error are, for each question, as in Table 2 below.

TABLE 2

| | |
|---|---|
| 1. | The effect of the position of the question in the survey presentation |
| 2. | The effect of the position of other questions in the survey presentation (cross-effects) |
| 3. | The effect of the attributes of the question, that is, color, display type, word phrasings in the survey presentation design |

A presentation design D is represented by the matrix pair ([v], [w]) where v is a 2-dimensional matrix of size n×n, where n is the number of questions, such that $v_{qp}$=1 if the question q is placed in the location p in D, and zero otherwise and w is a d-dimensional matrix of size $n \times m_1 \times m_2 \times \ldots \times m_d$ where there are d attributes $a_1, a_2, \ldots, a_d$ (for example, color, display type, and so on) that can be presented in $m_1, m_2, \ldots, m_d$ different ways in a presentation design, respectively, such that $w_{q \times x_1 x_2, \ldots, x_d}$=1 if for question q the presentation of attribute $a_i$ takes the value $x_i$ in D for all i (for example, attribute $a_i$ is color, and value $x_i$ is "red").

The total measurement error for a survey presentation design represented by the matrix pair ([v], [w]) can be modeled as Equation [3] below.

$$E = \sum_{q_i, p_i} v_{q_i p_i} g_1(p_i; \theta_i) + \sum_{q_i, q_j, p_i, p_j} v_{q_i} v_{q_j} g_2(p_i, p_j; \theta_{ij}) + \sum_{q_i, q_j, q_k, p_i, p_j, p_k} v_{q_i} v_{q_j} v_{q_k} g_3(p_i, p_j, p_k; \theta_{ijk}) + \ldots + \sum_{q_i, a_i} w_{q_i a_i} h(a_i; p_i) \quad [3]$$

In Equation [3] above, $g_1(.)$ captures the effect of the position $p_i$ of the question $q_i$ in the survey presentation design on the measurement error. $\theta_i$ is a set of parameters controlling the nature of the function $g_1(.)$ for the question $q_i$. The function $g_1(.)$ is represented as a parametric function.

$g_2(.), g_3(.), \ldots$ capture the second order and higher order effects of positions of other questions with respect to question $q_i$. $\theta_{ij}, \theta_{ijk}, \ldots$ are the parameters controlling the functions $g_2(.), g_3(.), \ldots$ that is, relative positions of the questions $g_2(.), g_3(.), \ldots$ relative positions of the questions $q_i$, $q_j$, and $q_k$ are represented as parametric functions.

$h(.)$ captures the effect of the attribute $a_i$ of the question $q_i$ in the survey presentation design on the measurement error. $\rho_i$ is a set of parameters controlling the nature of the function $h(.)$ for the question $q_i$. The function $h(.)$ is represented as a parametric function.

The optimal survey presentation design with respect to the total measurement error E can be obtained by minimizing the expression E with respect to ([v], [w]) subject to the constraints that are outlined as Equation [4] below.

$$\sum_p v_{qp} = 1 \,\forall\, q, \quad [4]$$

-continued $$\sum_q v_{qp} = 1 \forall\, p,$$

$$\sum_{a_i} w_{qa_1\ldots a_i\ldots a_d} = 1 \forall\, q, a_1, \ldots, a_{i-1}, a_{i+1}, \ldots, a_d$$

for all $i = 1, \ldots, d$

The first two constraints correspond to the restrictions that a question cannot appear in more than one location and that one location cannot be occupied by more than one question. The last set of constraints corresponds to the restriction that exactly one of the attribute values must be selected for each attribute in each question.

The survey presentation design parameters $\theta_i$, $\theta_{ij}$, $\theta_{ijk}, \ldots, \rho_l$ can be estimated from the observed measurement error as computed from the obtained set of responses for the different survey presentations designs (that is, for every offered survey design presentation) the matrix pair ([v], [w]) and the actual measurement error E is known.

Once the parameter set is known the expression for E can be optimized by various methods of stochastic and deterministic optimization (such as linear or quadratic programming, neural networks, simulated annealing, mean field annealing, genetic algorithms, randomized search algorithms).

Computer Hardware

Figure 4:
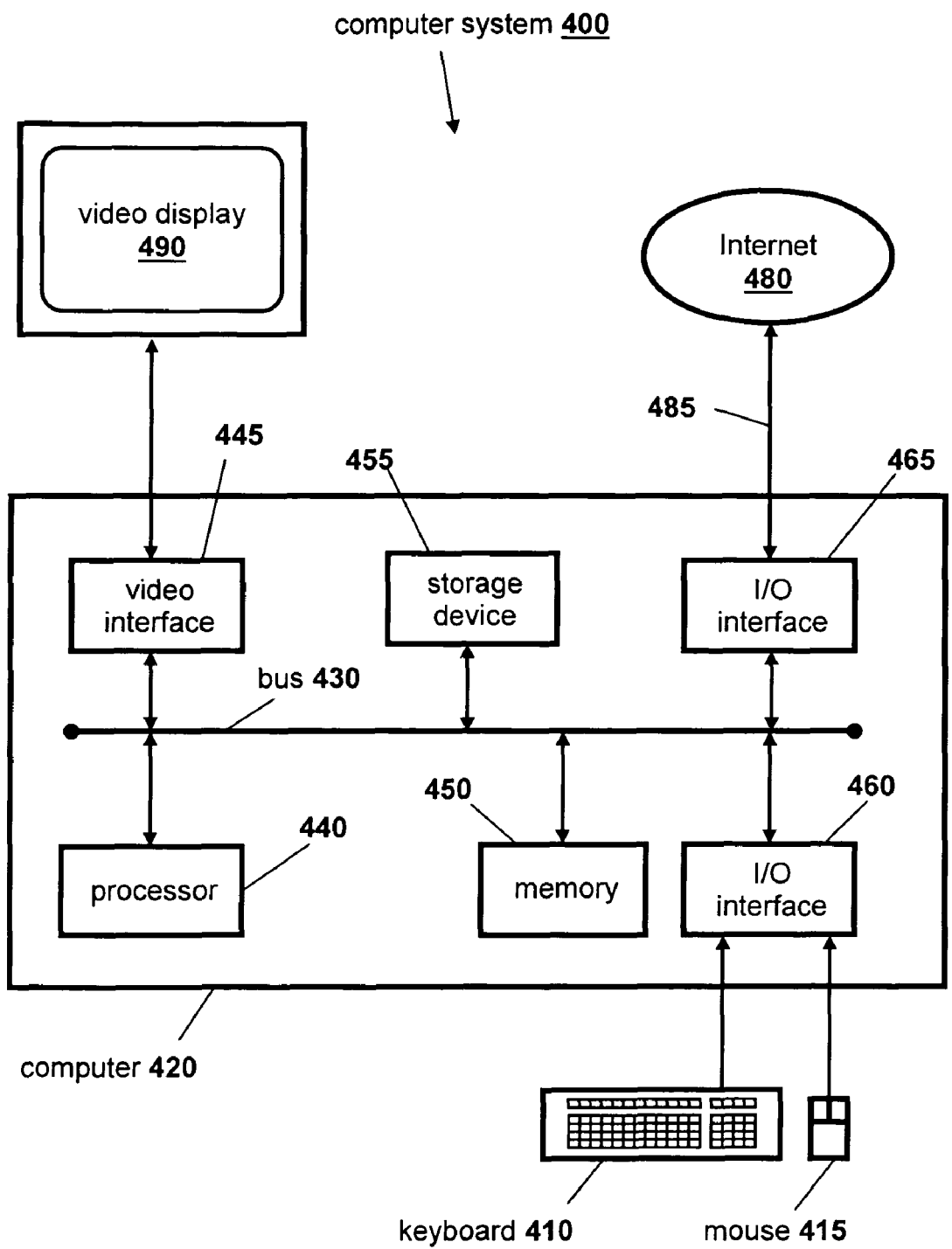
FIG. 4 is a schematic representation of a computer system suitable for performing the techniques described herein.

FIG. 4 is a schematic representation of a computer system 400 of a type that is suitable for executing computer software for assessing survey presentations. Computer software executes under a suitable operating system installed on the computer system 400, and may be thought of as comprising various software code means for achieving particular steps.

The components of the computer system 400 include a computer 420, a keyboard 410 and mouse 415, and a video display 490. The computer 420 includes a processor 440, a memory 450, input/output (I/O) interfaces 460, 465, a video interface 445, and a storage device 455.

The processor 440 is a central processing unit (CPU) that executes the operating system and the computer software executing under the operating system. The memory 450 includes random access memory (RAM) and read-only memory (ROM), and is used under direction of the processor 440.

The video interface 445 is connected to video display 490 and provides video signals for display on the video display 490. User input to operate the computer 420 is provided from the keyboard 410 and mouse 415. The storage device 455 can include a disk drive or any other suitable storage medium.

Each of the components of the computer 420 is connected to an internal bus 430 that includes data, address, and control buses, to allow components of the computer 420 to communicate with each other via the bus 430.

The computer system 400 can be connected to one or more other similar computers via a input/output (I/O) interface 465 using a communication channel 485 to a network, represented as the Internet 480.

The computer software may be recorded on a portable storage medium, in which case, the computer software program is accessed by the computer system 400 from the storage device 455. Alternatively, the computer software can be accessed directly from the Internet 480 by the computer 420. In either case, a user can interact with the computer system 400 using the keyboard 410 and mouse 415 to operate the programmed computer software executing on the computer 420.

Other configurations or types of computer systems can be equally well used to execute computer software that assists in implementing the techniques described herein.

CONCLUSION

Various alterations and modifications can be made to the techniques and arrangements described herein, as would be apparent to one skilled in the relevant art.

We claim:

1. A computer-implemented method for assessing survey presentations, said method comprising:
   generating, by a computer, a plurality of survey presentations, each survey presentation having a same information content and number of questions, and a different order of said number of questions, wherein
      an order for each of said number of questions is defined by a distance in a feature space between a question and another question in said order,
      each question has a number of features including word phrasing, color, and display type, and each feature of said number of features is defined by a different value of a distance metric in said feature space;
   offering, by said computer, said plurality of survey presentations to selections of a population grouped into sets of similar profiles to obtain observed responses in said feature space;
   estimating, by said computer, an unbiased response in said feature space from said observed responses, based upon a least mean square estimation of said observed responses to said plurality of survey presentations;
   determining, by said computer, a measurement error of the difference between said observed responses in said feature space and said unbiased response in said feature space for each question and for each of said sets of similar profiles; and
   removing, by said computer, those survey presentations, exceeding a threshold value of said measurement error, based on said difference of said observed responses in said feature space and said unbiased response in said feature space, from said plurality of survey presentations to provide a subset of favorably assessed survey presentations.

2. The method as claimed in claim 1, further comprising identifying a survey presentation having a lowest minimum measurement error.

3. The method as claimed in claim 1, further comprising minimizing an expression for said measurement error that incorporates parametric functions relating to a first position of a first question in each of said plurality of survey presentations and to first and second positions of first and second questions in each of said plurality of survey presentations.

4. The method as claimed in claim 1, wherein said those survey presentations exceeding a threshold value of said measurement error comprise outliers of said observed responses.

5. The method as claimed in claim 1, wherein said selections of a population are categorized by at least one of age, sex, country, political affiliation, and income group.

6. A computer program product for assessing survey presentations comprising computer readable program code recorded on a computer-readable storage medium for performing a method comprising:
   generating a plurality of survey presentations, each survey presentation having a same information content and number of questions, and a different order of said number of questions, wherein an order for each of said number of questions is defined by a distance in a feature space between a question and another question in said order, each question has a number of features including word phrasing, color, and display type, and each feature of said number of features is defined by a different value of a distance metric in said feature space;

offering said plurality of survey presentations to selections of a population grouped into sets of similar profiles to obtain observed responses in said feature space;

estimating an unbiased response in said feature space from said observed responses, based upon a least mean square estimation of said observed responses to said plurality of survey presentations;

determining a measurement error of the difference between said observed responses in said feature space and said unbiased response in said feature space for each question and for each of said sets of similar profiles; and removing those survey presentations, exceeding a threshold value of said measurement error, based on said difference of said observed responses in said feature space and said unbiased response in said feature space, from said plurality of survey presentations to provide a subset of favorably assessed survey presentations.

7. The computer program product as claimed in claim 6, wherein said method further comprises identifying a survey presentation having a lowest minimum measurement error.

8. The computer program product as claimed in claim 6, wherein said method further comprises minimizing an expression for said measurement error that incorporates parametric functions relating to a first position of a first question in each of said plurality of survey presentations and to first and second positions of first and second questions in each of said plurality of survey presentations.

9. The computer program product as claimed in claim 6, wherein said those survey presentations exceeding a threshold value of said measurement error comprise outliers of said observed responses.

10. The computer program product as claimed in claim 6, wherein said selections of a population are categorized by at least one of age, sex, country, political affiliation, and income group.

11. A computer-implemented method for assessing survey presentations, said method comprising:

generating, by a computer, a plurality of survey presentations, each survey presentation having a same information content and number of questions, and a different order of said number of questions, wherein an order for each of said number of questions is defined by a distance in a feature space between a question and another question in said order, each question has a number of features including word phrasing, color, and display type, and each feature of said number of features is defined by a different value of a distance metric in said feature space;

offering, by said computer, said plurality of survey presentations to selections of a population grouped into sets of similar profiles to obtain observed responses in said feature space;

estimating, by said computer, an unbiased response by using a penalty regularization function that measures entropy of probability distribution functions for said observed responses in said feature space;

computing, by said computer, a measurement error for each of said plurality of survey presentations corresponding to a deviation between said observed responses in said feature space and said estimated unbiased response in said feature space, wherein said deviation is calculated by a KL divergence/JS divergence measure; and selecting, by said computer, those survey presentations, beneath a threshold value of said measurement error, based on said deviation between said observed responses in said feature space and said estimated unbiased responses in said feature space, from said plurality of survey presentations to provide favorably assessed survey presentations.

12. The method as claimed in claim 11, further comprising identifying a survey presentation having a lowest minimum measurement error.

13. The method as claimed in claim 11, wherein said those survey presentations exceeding a threshold value of said measurement error comprise outliers of said observed responses.

14. The method as claimed in claim 11, wherein said selections of a population are categorized by at least one of age, sex, country, political affiliation, and income group.

* * * * *